United States Patent
Pape et al.

(10) Patent No.: US 11,675,710 B2
(45) Date of Patent: Jun. 13, 2023

(54) LIMITING TRANSLATION LOOKASIDE BUFFER SEARCHES USING ACTIVE PAGE SIZE

(71) Applicant: Apple Inc., Cupertino, CA (US)

(72) Inventors: John D. Pape, Cedar Park, TX (US); Brian R. Mestan, Austin, TX (US); Peter G. Soderquist, Milford, MA (US)

(73) Assignee: Apple Inc., Cupertino, CA (US)

(*) Notice: Subject to any disclaimer, the term of this patent is extended or adjusted under 35 U.S.C. 154(b) by 13 days.

(21) Appl. No.: 17/016,179

(22) Filed: Sep. 9, 2020

(65) Prior Publication Data

US 2022/0075735 A1    Mar. 10, 2022

(51) Int. Cl.
*G06F 12/1045* (2016.01)
*G06F 12/0882* (2016.01)
*G06F 9/455* (2018.01)
*G06F 12/1027* (2016.01)

(52) U.S. Cl.
CPC ...... *G06F 12/1063* (2013.01); *G06F 9/45558* (2013.01); *G06F 12/0882* (2013.01); *G06F 12/1027* (2013.01); *G06F 2009/45583* (2013.01); *G06F 2212/7201* (2013.01)

(58) Field of Classification Search
None
See application file for complete search history.

(56) References Cited

U.S. PATENT DOCUMENTS

| | | |
|---|---|---|
| 5,905,998 A | 5/1999 | Ebrahim et al. |
| 6,026,461 A | 2/2000 | Baxter et al. |
| 6,516,379 B1 | 2/2003 | Deshpande et al. |
| 6,523,076 B1 | 2/2003 | Kruse |
| 6,542,949 B1 | 4/2003 | Kruse |
| 7,079,485 B1 | 7/2006 | Lau et al. |
| 7,149,829 B2 | 12/2006 | Weber et al. |

(Continued)

OTHER PUBLICATIONS

Shreedhar et al., "Efficient Fair Queueing Using Deficit Round Robin", IEEE/ACM Transactions on Networking, Jun. 1996, pp. 375-385, vol. 4, No. 3, IEEE Press.

(Continued)

*Primary Examiner* — Yaima Rigol
(74) *Attorney, Agent, or Firm* — Kowert Hood Munyon Rankin and Goetzel PC; Rory D. Rankin

(57) ABSTRACT

Systems, apparatuses, and methods for limiting translation lookaside buffer (TLB) searches using active page size are described. A TLB stores virtual-to-physical address translations for a plurality of different page sizes. When the TLB receives a command to invalidate a TLB entry corresponding to a specified virtual address, the TLB performs, for the plurality of different pages sizes, multiple different lookups of the indices corresponding to the specified virtual address. In order to reduce the number of lookups that are performed, the TLB relies on a page size presence vector and an age matrix to determine which page sizes to search for and in which order. The page size presence vector indicates which page sizes may be stored for the specified virtual address. The age matrix stores a preferred search order with the most probable page size first and the least probable page size last.

20 Claims, 9 Drawing Sheets

(56) References Cited

U.S. PATENT DOCUMENTS

| | | | |
|---|---|---|---|
| 7,159,095 B2* | 1/2007 | Dale | G06F 12/1027 |
| | | | 711/208 |
| 7,430,650 B1 | 9/2008 | Ross | |
| 7,461,190 B2 | 12/2008 | Subramanian et al. | |
| 7,590,820 B2* | 9/2009 | Dong | G06F 12/1018 |
| | | | 711/209 |
| 8,037,250 B1 | 10/2011 | Barreh et al. | |
| 8,458,702 B1* | 6/2013 | Wu | G06F 9/45504 |
| | | | 718/1 |
| 8,682,864 B1 | 3/2014 | Plevyak et al. | |
| 9,058,284 B1* | 6/2015 | Ben-Meir | G06F 12/0855 |
| 9,690,714 B1* | 6/2017 | Sites | G06F 12/1027 |
| 10,255,197 B2 | 4/2019 | Pape et al. | |
| 2001/0010066 A1 | 7/2001 | Chin et al. | |
| 2010/0106936 A1* | 4/2010 | Doi | G06F 12/1027 |
| | | | 711/205 |
| 2011/0153955 A1* | 6/2011 | Herrenschmidt | G06F 12/1027 |
| | | | 711/146 |
| 2013/0238874 A1* | 9/2013 | Avudaiyappan | G06F 12/0802 |
| | | | 711/207 |
| 2014/0115297 A1* | 4/2014 | Cain, III | G06F 12/1027 |
| | | | 711/207 |
| 2017/0262381 A1* | 9/2017 | Swaine | G06F 12/1009 |
| 2017/0286300 A1 | 10/2017 | Doshi et al. | |
| 2019/0294551 A1* | 9/2019 | Abhishek Raja | G06F 12/1027 |
| 2020/0133881 A1* | 4/2020 | Campbell | G06F 12/0893 |
| 2020/0218665 A1* | 7/2020 | Swaine | G06F 12/1036 |
| 2021/0191877 A1* | 6/2021 | Leming, III | G06F 12/1027 |

OTHER PUBLICATIONS

Chidambaram Nachiappan, et al., U.S. Appl. No. 16/786,581, entitled "Configurable Packet Arbitration With Minimum Progress Guarantees", filed Feb. 10, 2020, 38 pages.

Non-Final Office Action in U.S. Appl. No. 16/786,581, dated Jul. 24, 2020, 13 pages.

Tong, et al., U.S. Appl. No. 15/939,099, entitled "Method to Ensure Forward Progress of a Processor in the Presence of Persistent External Cache/TLB Maintenance Requests", filed Mar. 28, 2018, 48 pages.

* cited by examiner

LIMITING TRANSLATION LOOKASIDE BUFFER SEARCHES USING ACTIVE PAGE SIZE

BACKGROUND

Technical Field

Embodiments described herein relate to the field of computing systems and, more particularly, to efficiently performing translation lookaside buffer search operations.

Description of the Related Art

Generally speaking, a variety of computing systems include one or more processors and any number of memory devices, and the processor(s) generate access requests for instructions and application data while processing software applications. Examples of processors include a central processing unit (CPU), data parallel processors like graphics processing units (GPUs), digital signal processors (DSPs), multimedia engines, and so forth. Each of the processors utilize virtual addresses when processing the accessed data and instructions. A virtual address space for the data and instructions stored in system memory and used by a software process is divided into pages of a given size. The virtual pages are mapped to pages of physical memory. Mappings of virtual addresses to physical addresses keep track of where virtual pages are stored in the physical memory. These mappings are stored in a page table and this page table is stored in memory. A translation look-aside buffer (TLB), which is also a cache, stores a subset of the page table.

The TLB resides between a processor and a given level of the cache hierarchy. Alternatively, a TLB resides between two levels of the system memory hierarchy. In use, the TLB is accessed with a virtual address of a given memory access request to determine whether the TLB contains an associated physical address for a memory location holding requested data. In some cases, multiple processors share the same page table. At times, a TLB will attempt to locate a virtual-to-physical mapping without knowing the page size of the physical page. For a first page size, a set-associative TLB uses a first subset of virtual address bits to identify a particular set while for a second page size, the set-associative TLB uses a second subset of virtual address bits to identify a particular set. Each different page size supported by the TLB requires a separate lookup of the TLB until a matching entry is found. This causes a slowdown in TLB throughput.

In view of the above, efficient methods and mechanisms for improving the efficiency of TLB search operations are desired.

SUMMARY

Systems, apparatuses, and methods for limiting translation lookaside buffer (TLB) searches using active page size are contemplated. In one embodiment, a TLB stores translations for a plurality of different page sizes. When the TLB receives a translation request for a specified virtual address, the TLB performs, for the plurality of different pages sizes, multiple different lookups of the indices corresponding to the specified virtual address. In order to reduce the number of lookups that are performed, the TLB relies on a page size presence vector and a prioritizer to determine which page sizes to search for and in which order. In one embodiment, the prioritizer is an age matrix. In other embodiments, the prioritizer may be other types of order matrices, probability oracles, or otherwise. The page size presence vector indicates which page sizes may be stored at the specified virtual address. The prioritizer stores an order in which these page sizes should be searched, in an order which has the most probable page size first and the least probable page size last. Using the page size presence vector and the prioritizer helps to reduce the number of search operations that are performed to find a matching TLB entry. This results in increased performance and reduced power consumption of the TLB.

These and other embodiments will be further appreciated upon reference to the following description and drawings.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

Figure 1:
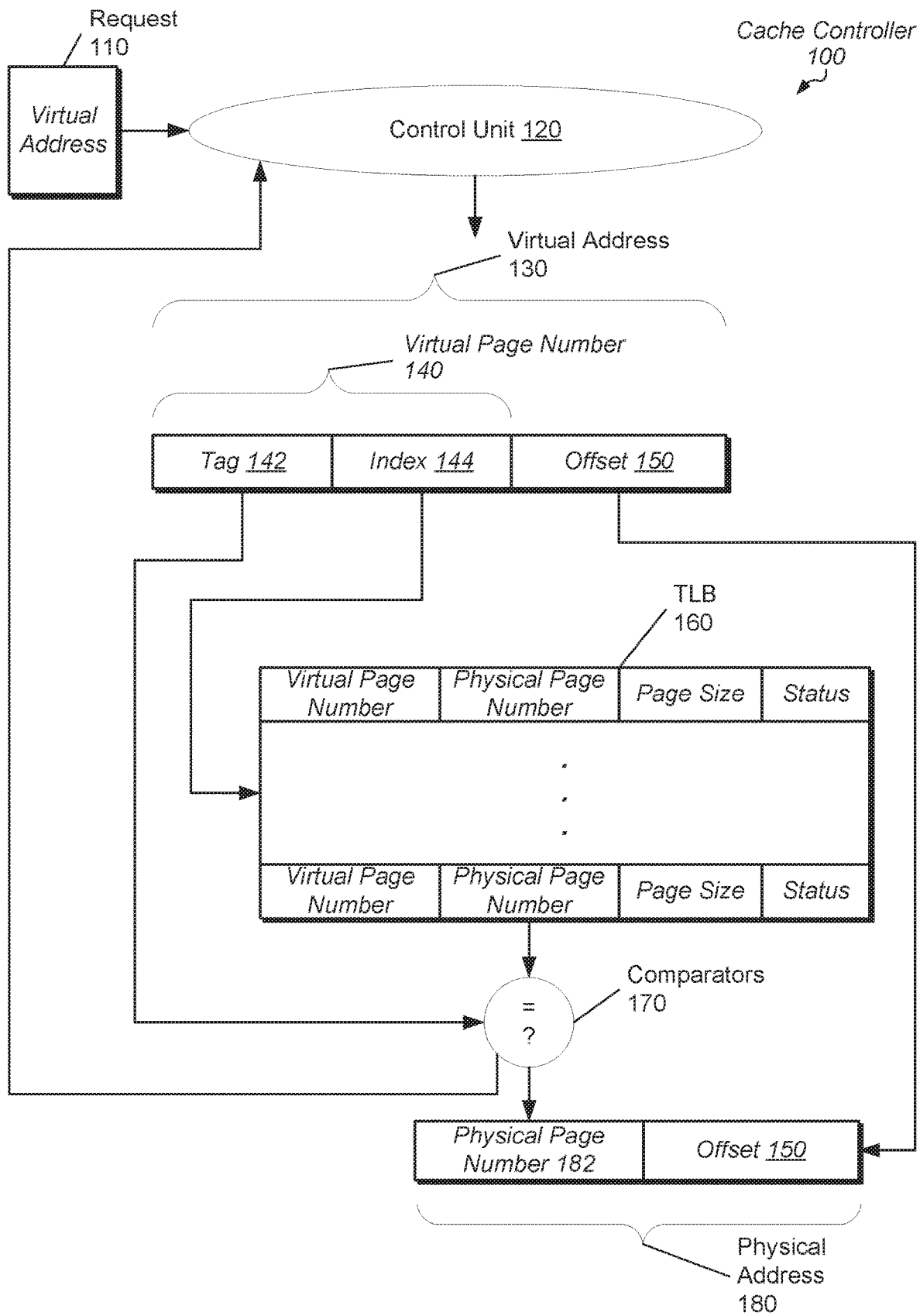
FIG. 1 is a generalized block diagram of one embodiment of a cache controller.

While the embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed. FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement, The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) for that unit/circuit/component.

In the following description, numerous specific details are set forth to provide a thorough understanding of the embodiments described in this disclosure. However, one having ordinary skill in the art should recognize that the embodiments might be practiced without these specific details. In some instances, well-known circuits, structures, and techniques have not been shown in detail for ease of illustration and to avoid obscuring the description of the embodiments.

Referring to FIG. 1, a block diagram of one embodiment of a cache controller 100 is shown. As shown, cache controller 100 includes at least a translation lookaside buffer (TLB) 160 for storing virtual-to-physical address mappings and control unit 120. In one embodiment, control unit 120 includes physical circuitry arranged in an appropriate manner to perform the various functions described herein. In various embodiments, cache controller 100 receives virtual addresses from processing circuitry in a processor, translates the virtual address 130 to a physical address 180 by accessing the TLB 160, and sends the physical address 180 to a data cache, which is not shown here for ease of illustration. While TLB 160 is shown as a single structure, it should be understood that this is shown for the purposes of simplicity. TLB 160 may actually include multiple separate banks, arrays, and other structures for storing mappings, metadata, and other data associated with the mappings. In one embodiment, TLB 160 supports storing virtual addresses corresponding to multiple page sizes at the same time. In one embodiment, TLB 160 supports five pages sizes such as 16 kilobyte (KB) pages, 64 KB pages, 2 megabyte (MB) pages, 32 MB pages and 512 MB pages. A variety of other numbers of page sizes and other page sizes can be supported in other embodiments.

Virtual address 130 includes a virtual page number 140 and an offset 150. The offset 150 is used to specify a particular byte in a page. The number of bits forming the virtual page number 140 and the number of bits forming the offset 150 depend on the page size. The virtual page number 140 is a virtual address portion used by processing circuitry in a processor when generating memory access requests.

When the TLB 160 stores data using a set-associative cache organization, the virtual page number 140 is divided into a tag 142 and an index 144, with the bit-size of tag 142 and index 144 varying according to the page size. Data is stored in the TLB 160 in various manners. In many cases, the stored data is partitioned into cache lines.

Each row in the TLB 160 stores a virtual page number of a virtual address and a corresponding physical page number of a physical address. In addition, a page size is stored when the TLB 160 is used to store multiple different page sizes at the same time. The status field stores various types of metadata such as a valid bit, a replacement state, and so forth.

One or more of the tag 142 and the index 144 of the virtual address 130 are used to search the TLB 160. When a set-associative cache organization is used, comparators 170 compare the tag portions of the virtual page numbers read from a particular set in the TLB 160 specified by the index 144. When a hit occurs, or there is a match between the virtual page number 140 and a virtual page number stored in an entry of the TLB 160, a physical page number is read out of the TLB entry and concatenated with the offset 150 to form the physical address 180. The physical address 180 is used to index into the data cache.

Additionally, the cache controller 100 processes maintenance requests such as invalidating multiple entries of the TLB 160. For example, a command, instruction, request or other sends an indication to the cache controller 100 to invalidate multiple mappings (entries) of the TLB 160. For example, a context switch or other change occurs to cause a portion of a page table stored in system memory to be removed or replaced. As used herein, the term "invalidate" is defined as marking a TLB entry as no longer available for use, thus effectively removing the entry from the structure.

While control unit 120 itself is implemented by hardware, its operations may variously be controlled by hardware alone, by instructions executed by control unit 120 (e.g., in the form of firmware of software instructions), or by a combination of these. For example, control unit 120 may include one or more of combinatorial logic, finite state machines, or control and status registers along with an interface to retrieve and execute firmware or other software instructions for running particular subroutines when particular values are stored in a subset of the control and status registers.

Figure 2:
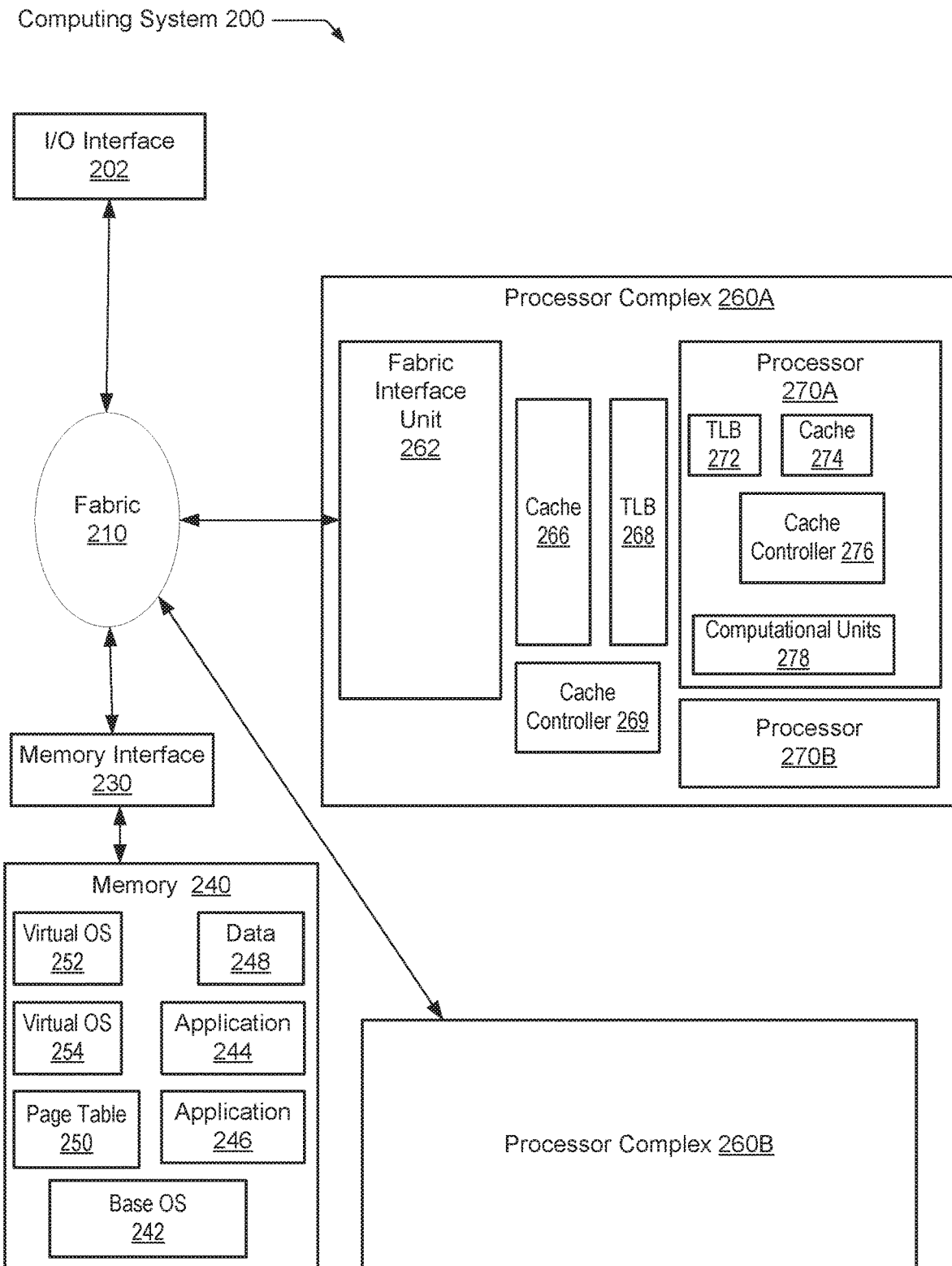
FIG. 2 is a generalized block diagram illustrating one embodiment of a computing system.

Referring to FIG. 2, a generalized block diagram of one embodiment of a computing system 200 is shown. As shown, a communication fabric 210 routes traffic between the input/output (I/O) interface 202, the memory interface 230, and the processor complexes 260A-260B. In various embodiments, the computing system 200 is a system on chip (SoC) that includes multiple types of integrated circuits on a single semiconductor die, each integrated circuit providing a separate functionality. In other embodiments, the multiple functional units are individual dies within a package, such as a multi-chip module (MCM). In yet other embodiments, the multiple functional units are individual dies or chips on a printed circuit board.

Clock sources, such as phase lock loops (PLLs), interrupt controllers, power managers, and so forth are not shown in FIG. 2 for ease of illustration. It is also noted that the number of components of the computing system 200 (and the number of subcomponents for those shown in FIG. 2, such as within each of the processor complexes 260A-260B) vary from embodiment to embodiment. The term "processor complex" is used to denote a configuration of one or more processor cores using local storage, such as a shared cache memory subsystem, and capable of processing a workload together.

In various embodiments, different types of traffic flow independently through the fabric 210. The independent flow is accomplished by allowing a single physical fabric bus to include a number of overlaying virtual channels, or dedicated source and destination buffers, each carrying a different type of traffic. Each channel is independently flow controlled with no dependence between transactions in different channels. The fabric 210 may also be packet-based, and may be hierarchical with bridges, cross bar, point-to-point, or other interconnects.

In some embodiments, the memory interface 230 uses at least one memory controller and at least one cache for the off-chip memory, such as synchronous DRAM (SDRAM). The memory interface 230 stores memory requests in request queues, uses any number of memory ports, and uses circuitry capable of interfacing to memory 240 using one or more of a variety of protocols used to interface with memory channels (not shown). In various embodiments, one or more of the memory interface 230, an interrupt controller (not shown), and the fabric 210 uses control circuitry to ensure coherence among the different processor complexes 260A-260B and peripheral devices.

As shown, memory 240 stores applications 244 and 246. In an example, a copy of at least a portion of application 244 is loaded into an instruction cache in one of the processors 270A-270B when application 244 is selected by the base operating system (OS) 242 for execution. Alternatively, one of the virtual (guest) OS's 252 and 254 selects application 244 for execution. Memory 240 stores a copy of the base OS 242 and copies of portions of base OS 242 are executed by one or more of the processors 270A-270B. Data 248 represents source data for applications in addition to result data and intermediate data generated during the execution of applications.

A virtual address space for the data stored in memory 240 and used by a software process is typically divided into pages of a prefixed size. The virtual pages are mapped to pages of physical memory. The mappings of virtual addresses to physical addresses where virtual pages are loaded in the physical memory are stored in page table 250. Each of translation look-aside buffers (TLBs) 268 and 272 stores a subset of page table 250.

In some embodiments, the components 262-278 of the processor complex 260A are similar to the components in the processor complex 260B. In other embodiments, the components in the processor complex 260A are substantially different from the components in processor complex 260B. As shown, processor complex 260A uses a fabric interface unit (FIU) 262 for providing memory access requests and responses to at least the processors 270A-270B. Processor complex 260A also supports a cache memory subsystem which includes at least cache 266. In some embodiments, the cache 266 is a shared off-die level two (L2) cache for the processors 270A-270B although an L2 cache is also possible and contemplated.

In some embodiments, the processors 270A-270B use a homogeneous architecture. For example, each of the processors 270A-270B is a general-purpose processor, such as a central processing unit (CPU), which utilizes circuitry for executing instructions according to a predefined general-purpose instruction set. Any of a variety of instruction set architectures (ISAs) is selected. In some embodiments, each core within processors 270A-270B supports the out-of-order execution of one or more threads of a software process and include a multi-stage pipeline. The processors 270A-270B may support the execution of a variety of operating systems.

In other embodiments, the processors 270A-270B use a heterogeneous architecture. In such embodiments, one or more of the processors 270A-270B is a highly parallel data architected processor, rather than a CPU. In some embodiments, these other processors of the processors 270A-270B use single instruction multiple data (SIMD) cores. Examples of SIMD cores are graphics processing units (GPUs), digital signal processing (DSP) cores, or otherwise.

In various embodiments, each one of the processors 270A-270B uses one or more cores and one or more levels of a cache memory subsystem. The processors 270A-270B use multiple one or more on-die levels (L1, L2, L3, and so forth) of caches for accessing data and instructions. If a requested block is not found in the on-die caches or in the off-die cache 266, then a read request for the missing block is generated and transmitted to the memory interface 230 via fabric 210. When one of applications 244-246 is selected for execution by processor complex 260A, a copy of the selected application is retrieved from memory 240 and stored in cache 266 of processor complex 260A. In various embodiments, each of processor complexes 260A-260B utilizes virtual addresses when retrieving instructions and data from caches 274 and 266 while processing applications 244-246.

Figure 3:
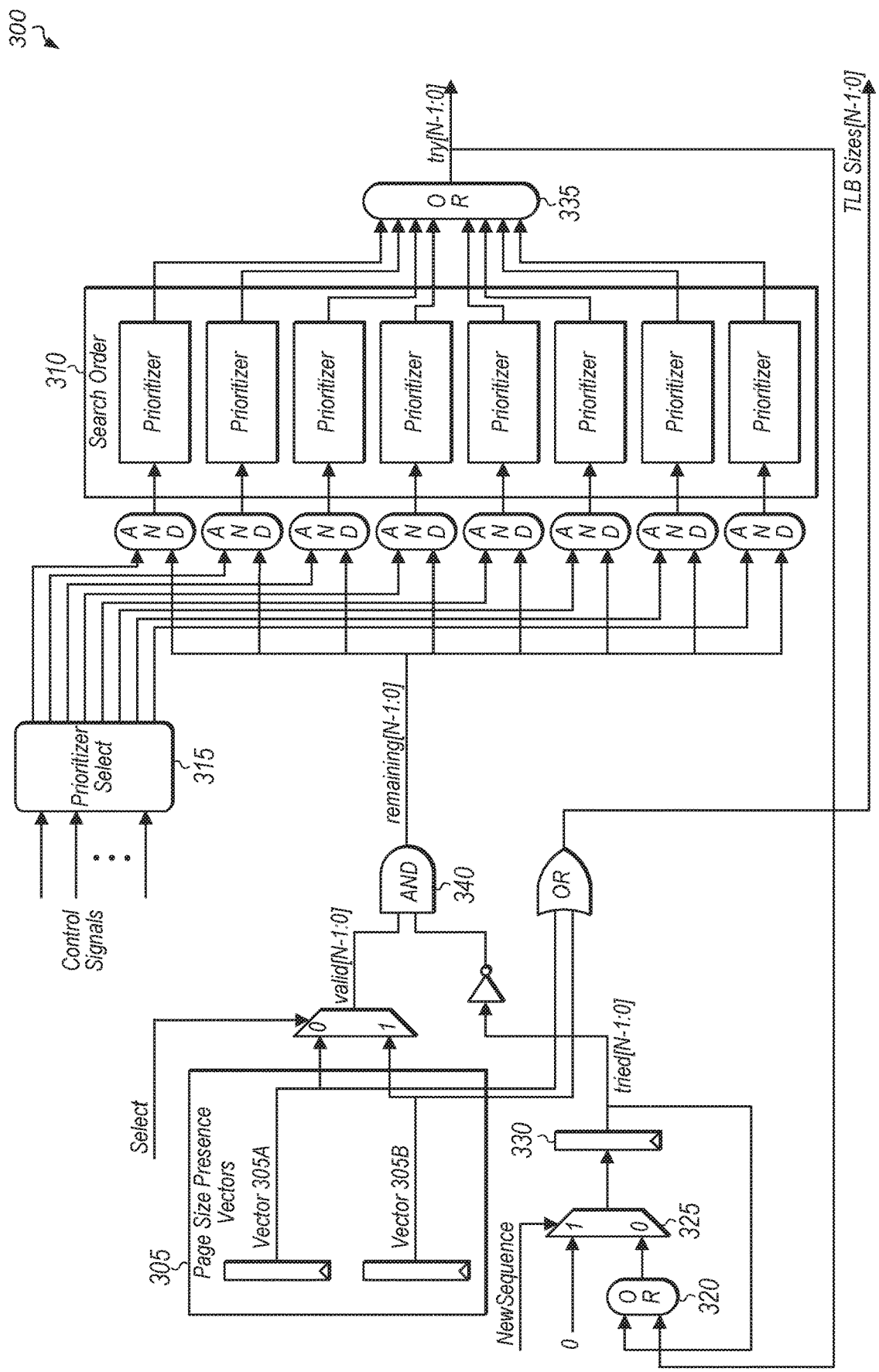
FIG. 3 is a block diagram of one embodiment of a TLB with presence vectors and prioritizers.

Referring now to FIG. 3, a block diagram of one embodiment of a TLB 300 with presence vectors 305 and prioritizers 310 is shown. In one embodiment, TLB 300 includes mappings for multiple different page sizes. In order to support efficient searches of TLB 300 when not knowing the page size for a given virtual address, TLB 300 includes presence vectors 305, age matrices 310, and supporting circuit elements. In one embodiment, the supporting circuit elements include prioritizer select unit 315 and various AND-gates, OR-gates, multiplexers, inverters, registers, and other elements situated at various locations within TLB 300. It should be understood that the circuit elements shown in FIG. 3 for TLB 300 are merely illustrative of one embodiment. In other embodiments, other suitable arrangements of circuit elements may be used.

While two presence vectors 305A-B are shown in TLB 300, it should be understood that this is intended to depict one possible embodiment. Generally speaking, presence vectors 305 are representative of any number of presence vectors, from 1 to M, with M a positive integer equal to two or greater. Similarly, prioritizers 310 are representative of any number of prioritizers, from 1 to P, with P a positive integer equal to two or greater. In one embodiment, the number of bits per presence vector 305A-B depends on the number of page sizes supported by the host computing system. For example, if there are four different page sizes supported by the host computing system, then there would be four bits per presence vector 305A-B. Other computing systems can support other numbers of different page sizes. For the embodiment illustrated by FIG. 3, the number of different page sizes is represented by "N", with N a positive integer greater than one.

In one embodiment, each presence vector 305A-B tracks which of the supported page sizes have been used for a corresponding selection context since a most recent reset event. The corresponding selection context may be a translation context (i.e., guest or host) in one embodiment. In other embodiments, the corresponding context may be based on some other identifying characteristic, such as an exception level, a portion or the entirety of an address space identifier (ASID), a portion or the entirety of virtual machine ID (VMID), a portion of the virtual address (e.g., a single virtual address bit), or otherwise. In one embodiment, an independent presence vector 305A-B is maintained for each separate context. In some embodiments, the different presence vectors 305A-B are combined together using a bitwise OR-operation. A presence vector bit is set when the corresponding page size is filled into the TLB using the context tracked by that particular presence vector 305A-B. In one embodiment, a vector is cleared on reset or in response to an invalidate-all request.

Prioritizer select unit 315 receives any number of control signals which determine the select signals that are generated by prioritizer select unit 315. The select signals output by prioritizer select unit 315 are coupled to the AND-gates that feed the age matrices 310. The number and type of control signals may vary according to the embodiment. In one embodiment, the control signals include an indication if the request is for a host, one or more bits of the virtual address, whether the request is for the data stream or instruction stream, and/or other types of indications.

In one embodiment, a given presence vector of presence vectors 305 is selected based on a first selection context and a given prioritizer of prioritizers 310 is selected based on a second selection context. The first and second selection contexts define one or more of translation regime, VMID, one or more bits of the given virtual address, whether the request came from an instruction or data access, and ASID. The subcomponents of the first and second selection contexts may be identical, overlapping, or unique. For example, in one embodiment, the selection of the given presence vector is based on a given virtual address bit and translation regime while the selection of the given prioritizer is based on the given virtual address bit, instruction/data type, and ASID. In other embodiments, the selection of the given presence vector may be based on other parameters and/or the selection of the given prioritizer may be based on other parameters.

Prioritizers 310 determine the search order for the page sizes that are specified by presence vectors 305. For example, if the selected presence vector 305 indicates that there are three possible page sizes for a given virtual address, then the selected prioritizer 310 will indicate the order that these three possible page sizes should be searched. By using the order indicated by prioritizer 310, the total time spent searching should be minimized. In other words, prioritizer 310 specifies as a first choice the page size which is predicted to have the highest likelihood of matching for the given virtual address. The second choice of page size specified by prioritizer 310 will have the second highest likelihood of matching for the given virtual address, the third choice of page size specified by prioritizer 310 will have the third highest likelihood of matching for the given virtual address, and so on. The time spent fulfilling translation requests should be reduced using the above described approach as compared to conventional approaches.

In one embodiment, the output from OR-gate 335 is the bit vector labeled "try[N−1:0]" which indicates which page size to try in the next clock cycle. This bit vector is provided to TLB control circuitry to help in determining which page size to search for the given virtual address in the next clock cycle. The bit vector output by OR-gate 335 is also coupled back to OR-gate 320 which feeds multiplexer 325. If a new sequence is initiated, then 0's are coupled to the output of multiplexer 325. Otherwise, if the same sequence is being processed, the output of OR-gate 320 is coupled through to the output of multiplexer 325.

The output of multiplexer 325 is coupled to register 330 which generates the N-bit vector labeled "tried[N−1:0]" which indicates which page sizes have already been searched. The tried[N−1:0] vector is also coupled back to one of the input ports of OR-gate 320. The output of register 330 is negated and provided to an input port of AND-gate 340. The selected presence vector 305 is provided to the other input port of AND-gate 340. The output of AND-gate is the N-bit vector labeled "remaining[N−1:0]" which indicates which of the applicable page sizes have not yet been searched. The remaining[N−1:0] vector is provided to the AND-gates which are feeding prioritizers 310.

It should be understood that while TLB 300 is illustrated as including both presence vectors 305 and prioritizers 310, this is merely shown to depict one possible embodiment. In other embodiments, a TLB may include only presence vectors or only prioritizers. In further embodiments, a TLB may also include other page size tracking mechanisms in addition to those shown for TLB 300 or in place of those shown for TLB 300. Additionally, it should be understood that the connections and arrangements of circuit elements shown in FIG. 3 for TLB 300 are merely indicative of one possible approach. Other approaches with other connections and/or arrangements of circuit elements that enable efficient TLB search operations are possible and are contemplated.

Figure 4:
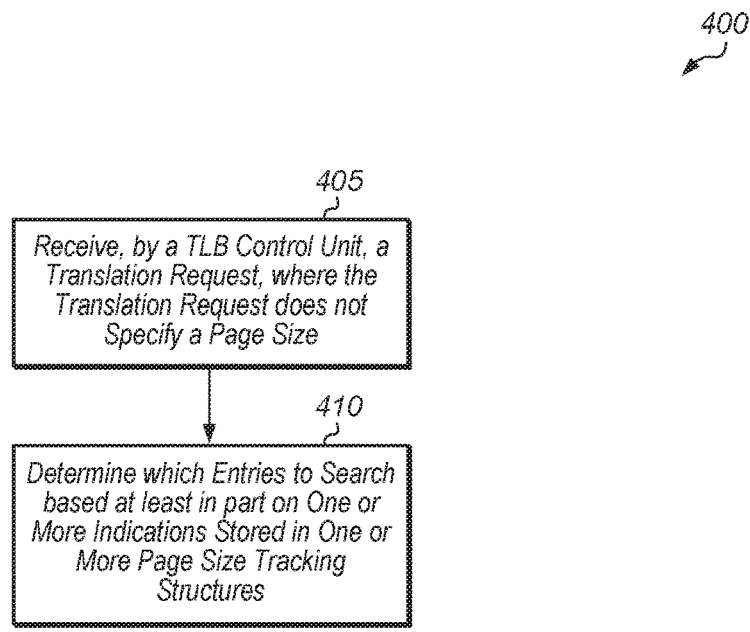
FIG. 4 is a flow diagram of one embodiment of a method for limiting translation lookaside buffer searches.

Referring now to FIG. 4, a generalized flow diagram of one embodiment of a method 400 for limiting translation lookaside buffer searches is shown. For purposes of discussion, the steps in this embodiment (as well as for FIGS. 5-8) are shown in sequential order. However, in other embodiments some steps may occur in a different order than shown, some steps may be performed concurrently, some steps may be combined with other steps, and some steps may be absent.

A control unit (e.g., control unit 120 of FIG. 1) of a TLB receives a translation request, where the translation request does not specify a page size (block 405). In one embodiment, the TLB includes entries for multiple different page sizes, and indexing of entries varies depending on page size. Next, the control unit determines which entries to search based at least in part on one or more indications stored in one or more page size tracking structures (block 410). In some cases, the control unit is able to eliminate searches for one or more entries based on the indication(s) stored in the page size tracking structure(s). After block 410, method 400 ends.

In one embodiment, the page size tracking structure(s) include a page size presence vector. In some cases, there is a separate page size presence vector for each translation regime. In another embodiment, the page size tracking structure(s) include a prioritizer (e.g., an age matrix) which specifies a preferred order of page size searching at the indices corresponding to a given virtual address. In this embodiment, the control unit searches in the preferred order, specified by the prioritizer, until a match is found for the given virtual address. In a further embodiment, the page size tracking structures include one or more page size presence vectors in addition to one or more age matrices. In other embodiments, the page size tracking structures include other types of mechanisms.

Figure 5:
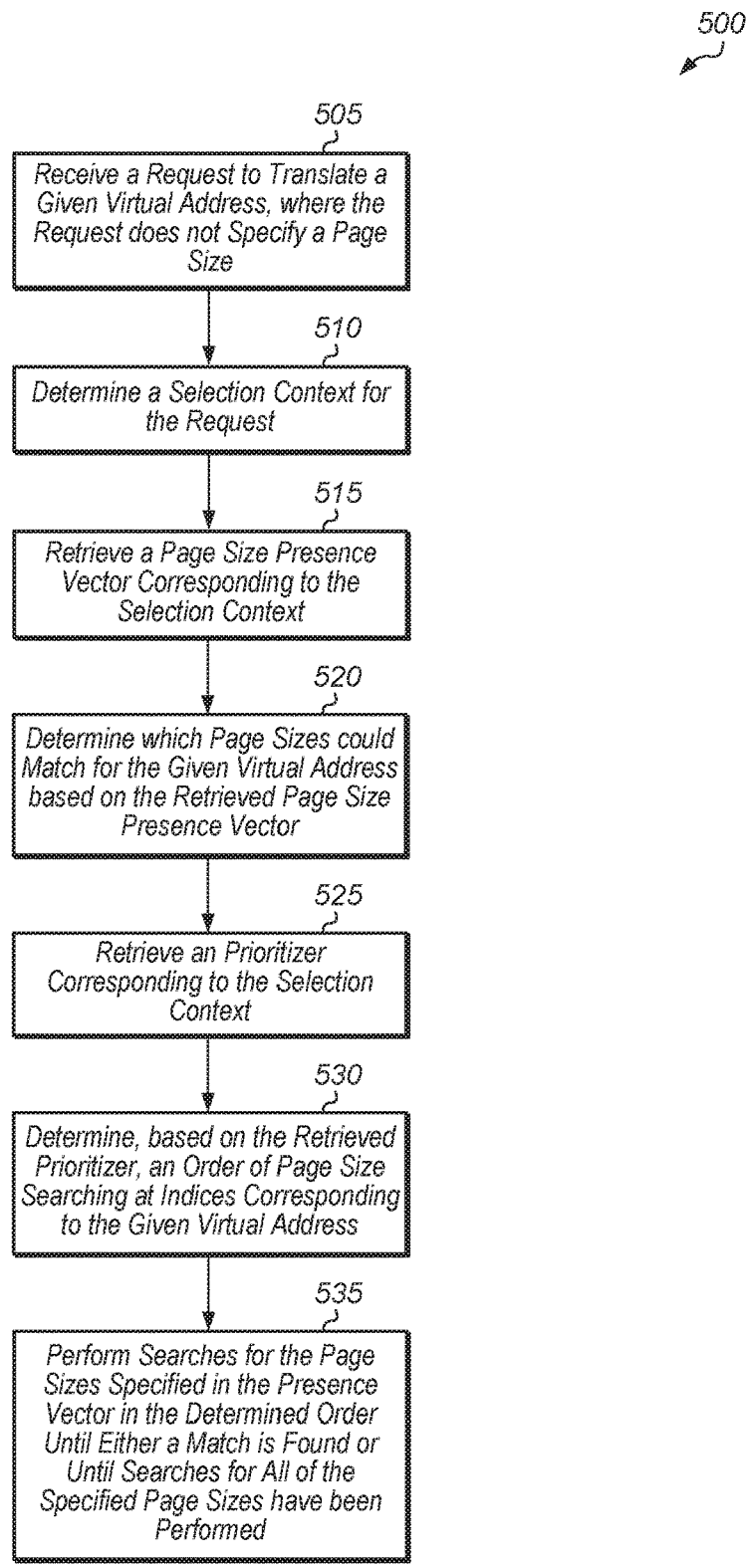
FIG. 5 is a flow diagram of one embodiment of a method for performing an efficient TLB search.

Referring now to FIG. 5, one embodiment of a method 500 for performing an efficient TLB search is shown. A control unit of a TLB receives a request to translate a given virtual address, where the request does not specify a page size (block 505). Next, the control unit determines a selection context associated with the request (block 510). Depending on the embodiment, the selection context is based on one or more of translation regime (e.g., either a host or guest), a portion of entirety of the virtual address bits, virtual machine ID, ASID, a random selector, or otherwise. In other embodiments, other types of translation contexts can be used. Then, the control unit retrieves a page size presence vector corresponding to the selection context (block 515). Next, the control unit determines which page sizes could match for the given virtual address based on the retrieved page size presence vector (block 520). In one embodiment, the retrieved page size presence vector indicates that searches for one or more of the possible page sizes can be skipped.

Then, the control unit retrieves a prioritizer corresponding to the selection context (block 525). In one embodiment, the prioritizer is an age matrix while in other embodiments, other types of prioritizers other than an age matrix may be utilized. Next, the control unit determines, based on the retrieved prioritizer, an order of page size searching at indices corresponding to the given virtual address (block 530). Then, the control unit performs searches for the page sizes specified by the presence vector in the determined order until either a match is found or until searches for all of the specified page sizes have been performed (block 535). After block 535, method 500 ends.

Figure 6:
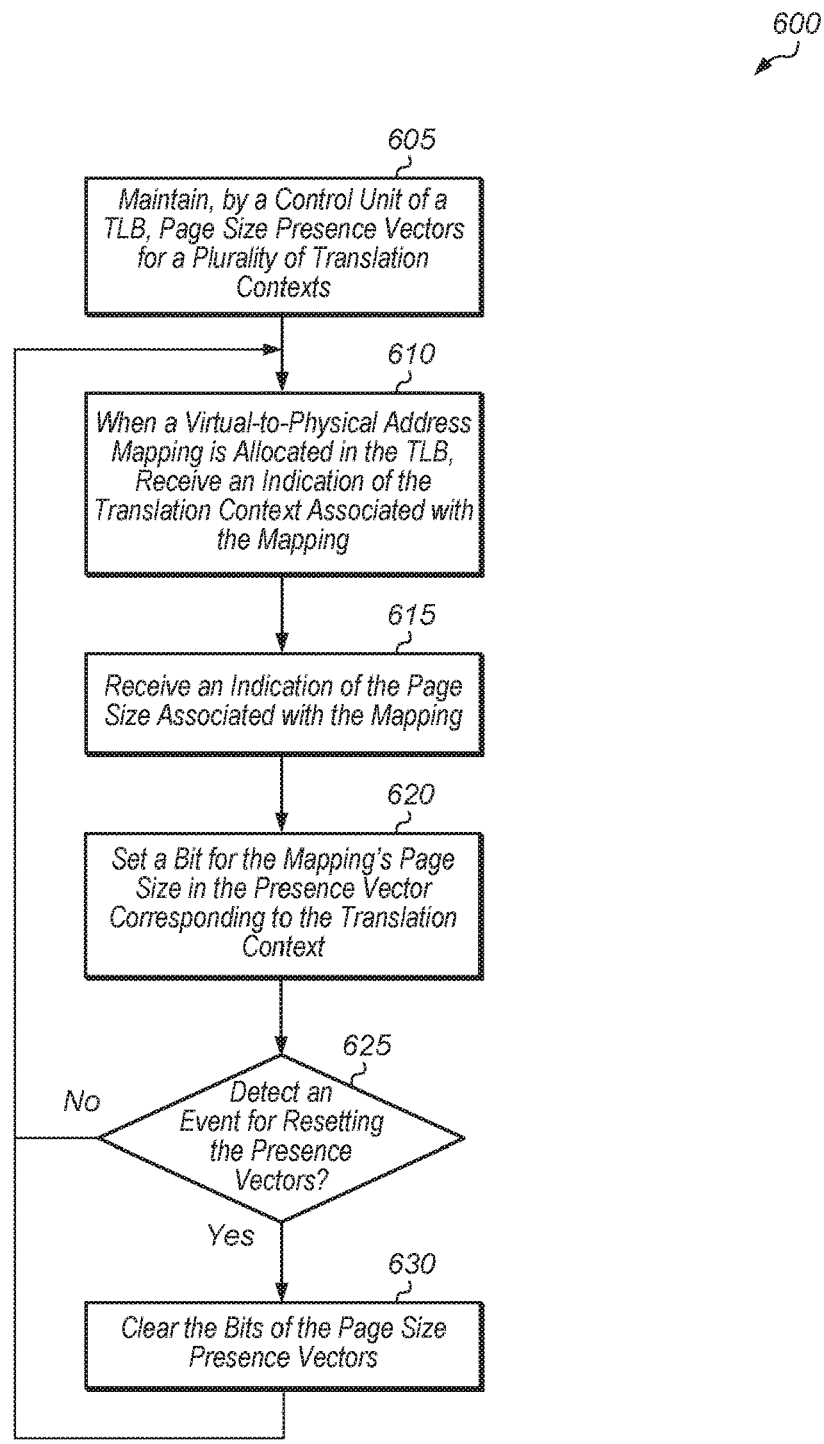
FIG. 6 is a flow diagram of one embodiment of a method for maintaining page size presence vectors.

Turning now to FIG. 6, one embodiment of a method 600 for maintaining page size presence vectors is shown. A TLB control unit maintains page size presence vectors for a plurality of translation contexts (block 605). When a virtual-to-physical address mapping is allocated in the TLB, the control unit receives an indication of the translation context associated with the mapping (block 610). Also, the control unit receives an indication of the page size associated with the mapping (block 615). Next, the control unit sets a bit for the mapping's page size in the page size presence vector corresponding to the translation context (if this bit is not already set) (block 620). If an event for resetting the page size presence vectors is detected (conditional block 625, "yes" leg), then the control unit clears the bits of the page size presence vectors (block 630). After block 630, method 600 returns to block 610. Examples of events include a reset, an invalidate-all request, or otherwise. These events could be caused by internal maintenance, replacement of the TLBs, execution of a TLB-Invalidate (TLBI) instruction, or otherwise. Alternatively, if an event for resetting the page size presence vectors is not detected (conditional block 625, "no" leg), then method 600 returns to block 610.

It is noted that in another embodiment, the setting and clearing of bits can be reversed in blocks 620 and 630. For example, in this embodiment, a bit is cleared to "0" to indicate a page size has been used for the given translation context, and bits are set to "1" when a reset event is detected. In other words, the meaning of the presence vector bit values in this embodiment is reversed as compared to their meaning in the embodiment described in method 600.

Figure 7:
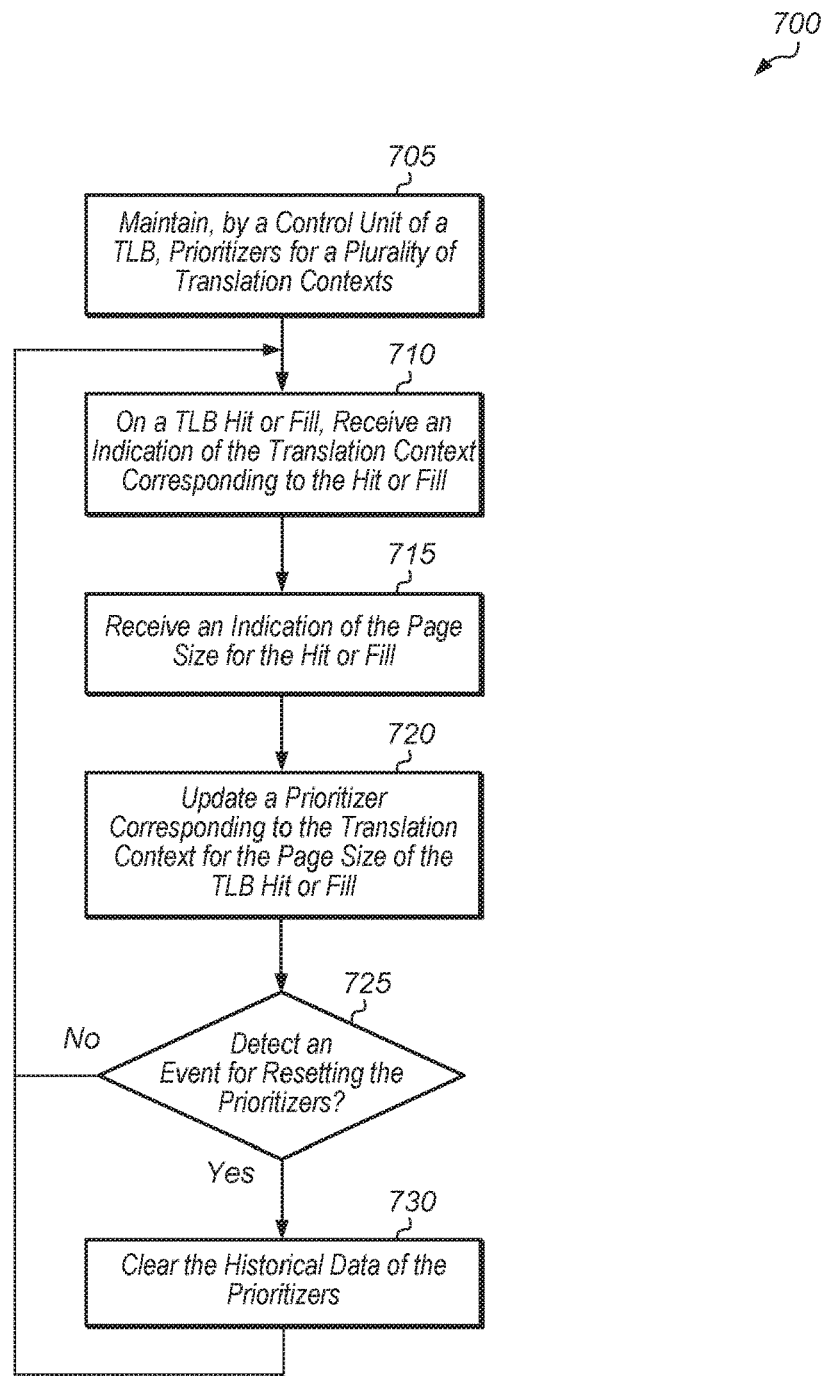
FIG. 7 is a flow diagram of one embodiment of a method for maintaining prioritizers to track recent page size usage in a TLB.

Referring now to FIG. 7, one embodiment of a method 700 for maintaining prioritizers to track recent page size usage in a TLB is shown. A TLB control unit (e.g., control unit 120 of FIG. 1) maintains prioritizers for a plurality of translation contexts (block 705). While the prioritizers may be age matrices in one embodiment, other types of prioritizer structures may be employed in other embodiments. On a TLB hit or fill, the control unit receives an indication of the translation context corresponding to the hit or fill (block 710). Also, the control unit receives an indication of the page size for the TLB hit or fill (block 715). Next, the control unit updates a prioritizer corresponding to the context for the page size of the TLB hit or fill (block 720). In one embodiment, the prioritizer is an age matrix which includes a set of bits for each page size to store a likelihood that the page size will be a match as compared to other page sizes of the plurality of page sizes. The number of bits (and number of page sizes) may vary according to the embodiment. In one embodiment, a bit in the age matrix at a first value indicates a first page size is more likely to be a match as compared to a second page size. In this embodiment, a bit in the age matrix of a second value (different from the first value) indicates the first page size is less likely to be a match as compared to the second page size, where the bit is set to the first value if the first page size was more recently used than the second page size. In one embodiment, if there are N possible page sizes for the host computing system, then the age matrix is a 2*N-bit half matrix.

If an event for resetting the prioritizers is detected (conditional block 725, "yes" leg), then the control unit clears the historical data of the prioritizers (block 730). Examples of events include a reset, an invalidate-all request, or otherwise. After block 730, method 700 returns to block 710. In one embodiment, it may not be as important to reset the prioritizers as it is to reset the presence vectors. The prioritizers determine the search order, and the prioritizers should be updated relatively quickly as new requests arrive. The presence vector determines how many sizes to search before giving up and attempting a table walk. In one embodiment, the historical data of the prioritizers (e.g., bits of the age matrices) are only cleared at reset.

Otherwise, if an event for resetting the age matrices is not detected (conditional block 725, "no" leg), then method 700 returns to block 710. It is noted that method 700 may be performed in conjunction with method 600. In other words, in one embodiment, the control unit maintains page size presence vectors in addition to maintaining age matrices for enabling efficient TLB searches for different page sizes.

Figure 8:
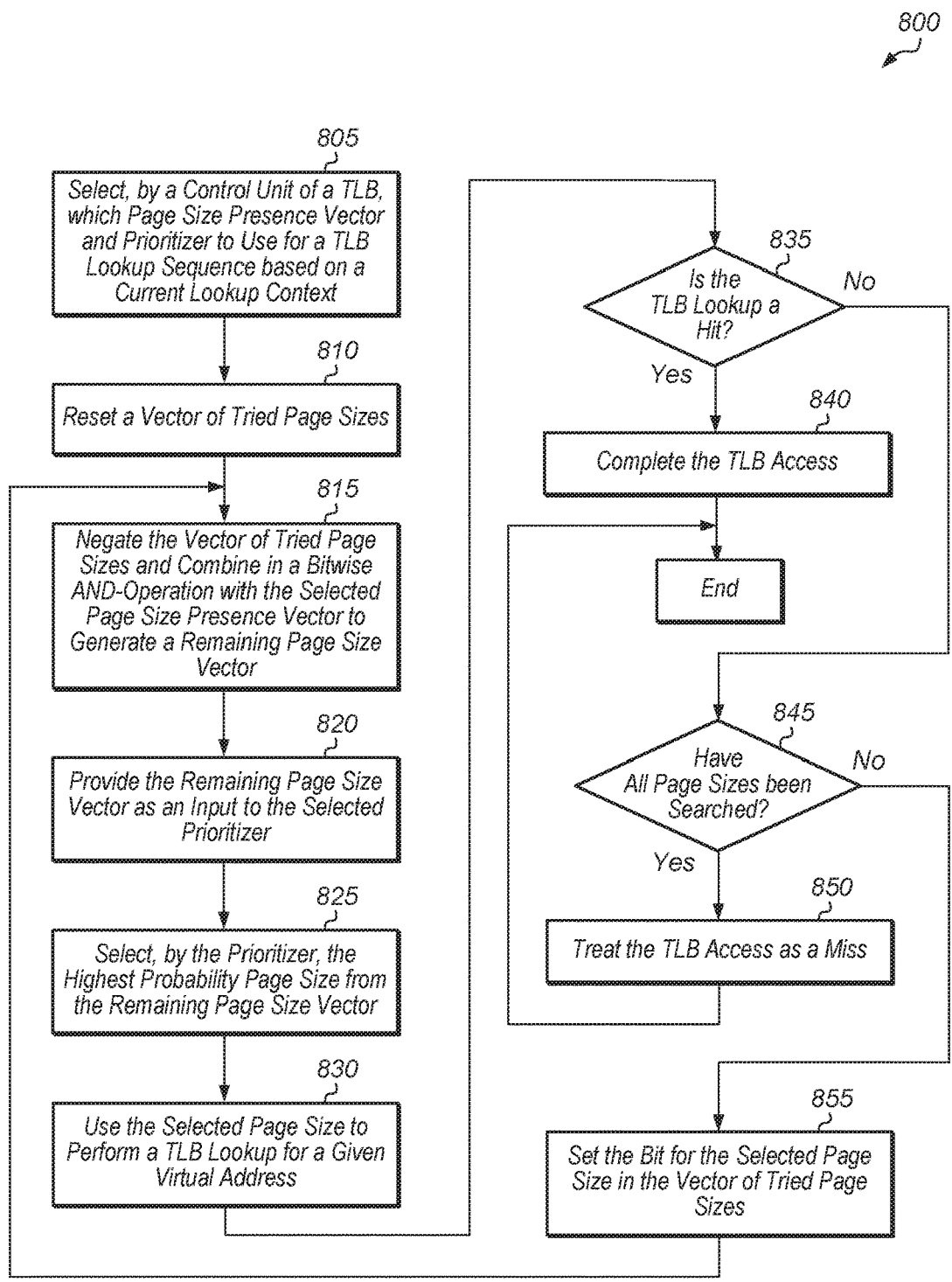
FIG. 8 is a flow diagram of one embodiment of a method for implementing a TLB lookup sequence.

Turning now to FIG. 8, one embodiment of a method 800 for implementing a TLB lookup sequence is shown. In response to receiving a TLB lookup request, a control unit (e.g., control unit 120 of FIG. 1) selects which page size presence vector and prioritizer to use based on a current lookup context (block 805). Also, a vector of tried page sizes is reset (block 810). Next, the vector of tried page sizes is negated and combined in a bitwise AND-operation with the selected page size presence vector to generate a remaining page size vector (block 815). In one embodiment, the remaining page size vector stores indicators for those page sizes which have not yet been searched for a given virtual address.

Then, the remaining page size vector is provided as an input to the selected prioritizer (block 820). Next, the prioritizer selects the highest probability page size from the remaining page size vector (block 825). Then, the selected page size is used to perform a TLB lookup for a given virtual address (block 830). If the TLB lookup is a hit (conditional block 835, "yes" leg), then the TLB access is completed (block 840) and then method 800 ends. Otherwise, if the TLB lookup is a miss (conditional block 835, "no" leg), then it is determined if all page sizes have been searched for the selected page size presence vector (conditional block 845). If all page sizes have been searched for the selected page size presence vector (conditional block 845, "yes" leg), then the TLB access is treated as a miss (block 850), and then method 800 ends. Otherwise, if not all page sizes have been searched for the selected page size presence vector (conditional block 845, "no" leg), then the bit for the selected page size in the vector of tried page sizes is set (block 855). After block 855, method 800 returns to block 815.

Figure 9:
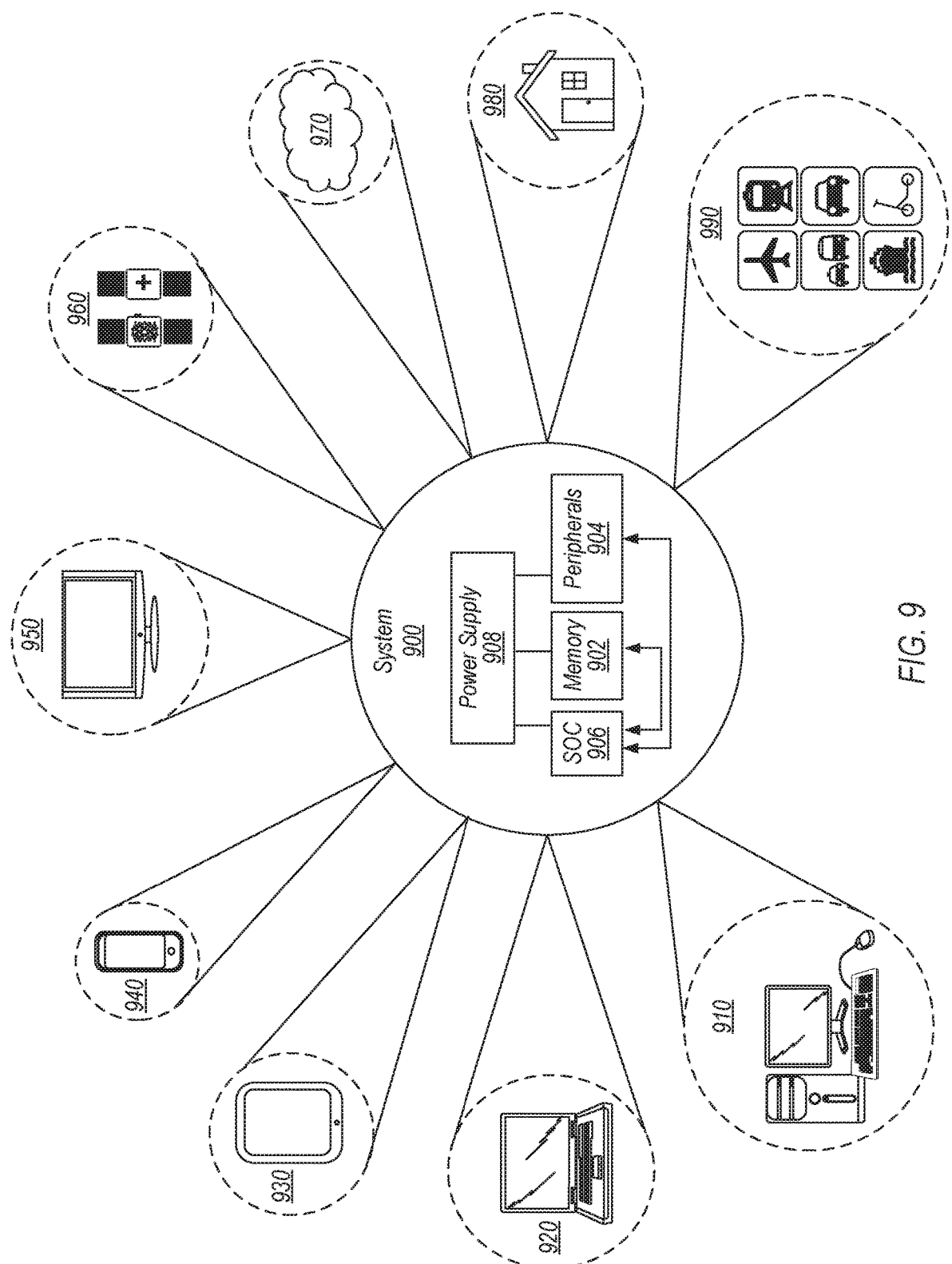
FIG. 9 is a block diagram of one embodiment of a system.

Referring now to FIG. 9, a block diagram of one embodiment of a system 900 is shown that may incorporate and/or otherwise utilize the methods and mechanisms described herein. In the illustrated embodiment, the system 900 includes at least one instance of a system on chip (SoC) 906 which may include multiple types of processing units, such as a central processing unit (CPU), a graphics processing unit (GPU), or otherwise, a communication fabric, and interfaces to memories and input/output devices. In some embodiments, one or more processors in SoC 906 includes at least one TLB. In some embodiments, SoC 906 includes components similar to cache controller 100 (of FIG. 1) and computing system 200 (of FIG. 2). In various embodiments, SoC 906 is coupled to external memory 902, peripherals 904, and power supply 908.

A power supply 908 is also provided which supplies the supply voltages to SoC 906 as well as one or more supply voltages to the memory 902 and/or the peripherals 904. In various embodiments, power supply 908 represents a battery (e.g., a rechargeable battery in a smart phone, laptop or tablet computer, or other device). In some embodiments, more than one instance of SoC 906 is included (and more than one external memory 902 may be included as well).

The memory 902 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

The peripherals 904 include any desired circuitry, depending on the type of system 900. For example, in one embodiment, peripherals 904 includes devices for various types of wireless communication, such as wifi, Bluetooth, cellular, global positioning system, etc. In some embodiments, the peripherals 904 also include additional storage, including RAM storage, solid state storage, or disk storage. The peripherals 904 include user interface devices such as a display screen, including touch display screens or multi-touch display screens, keyboard or other input devices, microphones, speakers, etc.

As illustrated, system 900 is shown to have application in a wide range of areas. For example, system 900 may be utilized as part of the chips, circuitry, components, etc., of a desktop computer 910, laptop computer 920, tablet computer 930, cellular or mobile phone 940, or television 950 (or set-top box coupled to a television). Also illustrated is a smartwatch and health monitoring device 960. In some embodiments, smartwatch may include a variety of general-purpose computing related functions. For example, smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 900 may further be used as part of a cloud-based service(s) 970. For example, the previously mentioned devices, and/or other devices, may access computing resources in the cloud (i.e., remotely located hardware and/or software resources). Still further, system 900 may be utilized in one or more devices of a home 980 other than those previously mentioned. For example, appliances within the home 980 may monitor and detect conditions that warrant attention. For example, various devices within the home 980 (e.g., a refrigerator, a cooling system, etc.) may monitor the status of the device and provide an alert to the homeowner (or, for example, a repair facility) should a particular event be detected. Alternatively, a thermostat may monitor the temperature in the home 980 and may automate adjustments to a heating/cooling system based on a history of responses to various conditions by the homeowner. Also illustrated in FIG. 9 is the application of system 900 to various modes of transportation 990. For example, system 900 may be used in the control and/or entertainment systems of aircraft, trains, buses, cars for hire, private automobiles, waterborne vessels from private boats to cruise liners, scooters (for rent or owned), and so on. In various cases, system 900 may be used to provide automated guidance (e.g., self-driving vehicles), general systems control, and otherwise. These and many other embodiments are possible and are contemplated. It is noted that the devices and applications illustrated in FIG. 9 are illustrative only and are not intended to be limiting. Other devices are possible and are contemplated.

In various embodiments, program instructions of a software application may be used to implement the methods and/or mechanisms previously described. The program instructions describe the behavior of hardware in a high-level programming language, such as C. Alternatively, a hardware design language (HDL) may be used, such as Verilog. The program instructions are stored on a non-transitory computer readable storage medium. Numerous types of storage media are available. The storage medium is accessible by a computer during use to provide the program instructions and accompanying data to the computer for program execution. In some embodiments, a synthesis tool reads the program instructions in order to produce a netlist comprising a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
    a translation lookaside buffer (TLB) comprising a plurality of entries of a plurality of different page sizes, wherein indexing of entries varies depending on page size; and
    control circuitry configured to:
        receive a translation request corresponding to a given virtual address, wherein the translation request does not specify a page size; and
        prior to accessing the plurality of entries of the TLB:
            determine a first selection context different from the given virtual address, in response to a determination that the given virtual address corresponds to the first selection context;

load, based on the first selection context, a first page size presence vector from one of one or more page size tracking structures;

retrieve one or more indications stored in the first page size presence vector; and determine which entries of the plurality of entries to search, based at least in part on the one or more indications.

2. The apparatus as recited in claim 1, wherein the control circuitry is further configured to determine, based on a page size presence vector, which page sizes to search for at a plurality of indices corresponding to the given virtual address.

3. The apparatus as recited in claim 2, wherein the page size presence vector indicates that searches for one or more page sizes can be skipped.

4. The apparatus as recited in claim 2, wherein:

the first selection context comprises at least two or more of a translation regime, a virtual machine identifier (VMID), one or more bits of the given virtual address, and an address space identifier (ASID); and the control circuitry is further configured to load a second page size presence vector in response to determining the given virtual address corresponds to a second selection context, wherein the second selection context comprises at least two or more of translation regime, the VMID, one or more bits of the given virtual address, and the ASID different from the first selection context, and wherein the second page size presence vector stores a different bit pattern from the first page size presence vector.

5. The apparatus as recited in claim 4, wherein the control circuitry is further configured to:

perform a bitwise OR-operation to combine the first page size presence vector and the second page size presence vector; and determine, based on a combined page size presence vector, which page sizes to search for at the indices corresponding to the given virtual address.

6. The apparatus as recited in claim 1, wherein the control circuitry is further configured to:

determine, based on a prioritizer, an order of page size searching at a plurality indices corresponding to the given virtual address specified by the translation request, wherein the prioritizer is chosen based on a given selection context defining one or more of translation regime, VMID, whether the translation request is associated with an instruction access or a data access, and ASID; and search in the determined order until a match is found at an index of a plurality of indices corresponding to the given virtual address.

7. The apparatus as recited in claim 6, wherein the prioritizer is an age matrix which stores a set of bits for each page size to compare a likelihood that the page size will be a match as compared to other page sizes of the plurality of different page sizes.

8. A method comprising:

storing mappings of virtual addresses to physical addresses in a translation lookaside buffer (TLB) comprising a plurality of entries of a plurality of different page sizes, wherein indexing of entries varies depending on page size;

receiving, by control circuitry in the TLB, a translation request corresponding to a given virtual address, wherein the translation request does not specify a page size; and prior to accessing, by the control circuitry, the plurality of entries of the TLB:

determining, by the control circuitry, a first selection context different from the given virtual address, in response to a determination that the given virtual address corresponds to the first selection context;

loading, by the control circuitry based on the first selection context, a first page size presence vector from one of one or more page size tracking structures;

retrieving, by the control circuitry, one or more indications stored in the first page size presence vector; and determining, by the control circuitry, which entries of a plurality of TLB entries to search, based at least in part on the one or more indications.

9. The method as recited in claim 8, further comprising determining, based on a page size presence vector, which page sizes to search for at a plurality of indices corresponding to the given virtual address.

10. The method as recited in claim 9, wherein the page size presence vector indicates that searches for one or more page sizes can be skipped.

11. The method as recited in claim 9, wherein:

the first selection context comprises at least two or more of a translation regime, a virtual machine identifier (VMID), one or more bits of the given virtual address, and an address space identifier (ASID); and the method further comprises loading a second page size presence vector in response to determining the given virtual address corresponds to a second selection context, wherein the second selection context comprises at least two or more of translation regime, the VMID, one or more bits of the given virtual address, and the ASID different from the first selection context, and wherein the second page size presence vector stores a different bit pattern from the first page size presence vector.

12. The method as recited in claim 11, further comprising:

performing a bitwise OR-operation to combine the first page size presence vector and the second page size presence vector; and determining, based on a combined page size presence vector, which page sizes to search for at the indices corresponding to the given virtual address.

13. The method as recited in claim 8, further comprising:

determining, based on a prioritizer, an order of page size searching at a plurality of indices corresponding to the given virtual address specified by the translation request, wherein the prioritizer is chosen based on a given selection context defining one or more of translation regime, VMID, whether the translation request is associated with an instruction access or a data access, and ASID; and searching in the determined order until a match is found at an index of a plurality of indices corresponding to the given virtual address.

14. The method as recited in claim 13, wherein the prioritizer is an age matrix stores a set of bits for each page size to compare a likelihood that the page size will be a match as compared to other page sizes of the plurality of different page sizes.

15. A system comprising:

one or more page size tracking structures;

a translation lookaside buffer (TLB) comprising a plurality of entries of a plurality of different page sizes, wherein indexing of entries varies depending on page size; and control circuitry configured to:
receive a translation request corresponding to a given virtual address, wherein the translation request does not specify a page size; and
prior to accessing the plurality of entries of the TLB:
determine a first selection context different from the given virtual address, in response to a determination that the given virtual address corresponds to the first selection context;
load, based on the first selection context, a first page size presence vector from one of one or more page size tracking structures;
retrieve one or more indications stored in the first page size presence vector; and
determine which entries of the plurality of entries to search, based at least in part on the one or more indications.

16. The system as recited in claim 15, wherein the one or more page size tracking structures comprise a page size presence vector, wherein the control circuitry is further configured to determine, based on the page size presence vector, which page sizes to search for at a plurality of indices corresponding to the given virtual address.

17. The system as recited in claim 16, wherein the page size presence vector indicates that searches for one or more page sizes can be skipped.

18. The system as recited in claim 16, wherein:
the first selection context comprises at least two or more of a translation regime, a virtual machine identifier (VMID), one or more bits of the given virtual address, and an address space identifier (ASID); and
the control circuitry is further configured to load a second page size presence vector in response to determining the given virtual address corresponds to a second selection context, wherein the second selection context comprises at least two or more of translation regime, the VMID, one or more bits of the given virtual address, and the ASID different from the first selection context, and wherein the second page size presence vector stores a different bit pattern from the first page size presence vector.

19. The system as recited in claim 18, wherein the control circuitry is further configured to:
perform a bitwise OR-operation to combine the first page size presence vector and the second page size presence vector; and
determine, based on a combined page size presence vector, which page sizes to search for at the indices corresponding to the given virtual address.

20. The system as recited in claim 15, wherein the one or more page size tracking structures comprise a prioritizer, wherein the control circuitry is further configured to:
determine, based on the prioritizer, an order of page size searching at a plurality indices corresponding to the given virtual address specified by the translation request, wherein the prioritizer is chosen based on a given selection context defining one or more of translation regime, VMID, whether the translation request is associated with an instruction access or a data access, and ASID; and
search in the determined order until a match is found at an index of a plurality of indices corresponding to the given virtual address.

* * * * *